United States Patent
Schulz

(10) Patent No.: US 8,229,257 B2
(45) Date of Patent: Jul. 24, 2012

(54) LIGHT-EMITTING DEVICE

(75) Inventor: Volkmar Schulz, Stolberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1058 days.

(21) Appl. No.: 12/097,137

(22) PCT Filed: Dec. 6, 2006

(86) PCT No.: PCT/IB2006/054631
§ 371 (c)(1),
(2), (4) Date: Jun. 12, 2008

(87) PCT Pub. No.: WO2007/069142
PCT Pub. Date: Jun. 21, 2007

(65) Prior Publication Data
US 2009/0002976 A1   Jan. 1, 2009

(30) Foreign Application Priority Data

Dec. 14, 2005  (EP) ...................................... 05112119

(51) Int. Cl.
*G02B 6/26* (2006.01)
*G02B 6/42* (2006.01)
*G02F 1/35* (2006.01)
*F21V 9/16* (2006.01)

(52) U.S. Cl. ............................. 385/16; 362/84; 359/326
(58) Field of Classification Search .................. 385/16; 362/84; 359/326
See application file for complete search history.

(56) References Cited

U.S. PATENT DOCUMENTS

| 3,652,956 | A |  | 3/1972 | Pinnow et al. |
| 4,784,451 | A |  | 11/1988 | Nakamura et al. |
| 5,268,975 | A | * | 12/1993 | Yoshitani et al. ............... 385/22 |
| 2006/0018006 | A1 * | | 1/2006 | Watanabe ...................... 359/332 |
| 2006/0262243 | A1 * | | 11/2006 | Lester et al. .................... 349/71 |
| 2007/0070614 | A1 * | | 3/2007 | Ng ................................. 362/30 |

FOREIGN PATENT DOCUMENTS

| CN | 2209341 Y | 10/1995 |
| DE | 2033805 | 11/1971 |
| EP | 1725050 | 11/2006 |

* cited by examiner

*Primary Examiner* — Ryan Lepisto
*Assistant Examiner* — Jerry Blevins

(57) ABSTRACT

A light-emitting device for emitting light having a desired color point, comprising at least one solid-state light source (1), at least one light-converting element (5), a light guiding arrangement (2) and a switch control unit (4), wherein the solid-state light source (1) is provided for emitting primary radiation (20), the light guiding arrangement (2) arranged between the solid-state light source (1) and the light-converting element (5) has at least one electro-optical switch (31) for controllably splitting the primary radiation (20) into a first portion (21) and a second portion (22), the switch control unit (4) is provided for controlling the electro-optical switch or switches (31) for variably adjusting the ratio between the first (21) and the second portion (22) of the primary radiation (20), and the light-converting element (5) is provided for the partial or complete absorption of at least a first portion (21) of the primary radiation (20) and for the re-emission of secondary radiation.

15 Claims, 2 Drawing Sheets

LIGHT-EMITTING DEVICE

Figure 1:
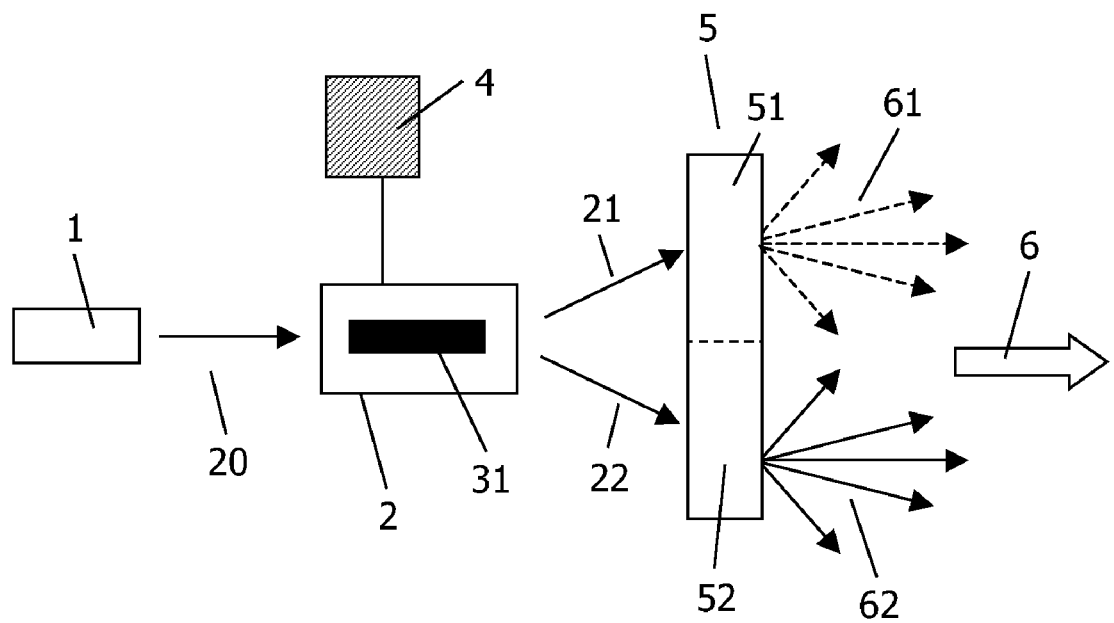

The invention relates to a light-emitting device for emitting colored or white light, comprising a solid-state light source, an element for light conversion and a light guiding arrangement.

Solid-state light sources such as LEDs or laser diodes have the advantage of good power and cost efficiency vis-à-vis conventional light sources, and in addition they have a long life span and a compact structure. For producing white light, varicolored LEDs can be used whose emitted light results in white light by means of additive color mixing. A disadvantage of such an arrangement is the possible variation of the color point of the mixed light due to a different aging behavior (change in the intensity of the emitted light under the same operating conditions) of the LEDs over the operating time. To avoid a color point shift in such an device, the emitted quantity of light per LED has to be measured elaborately by means of measuring sensors, and the operating conditions of the LEDs have to be readjusted elaborately via a control device. Such LED devices can be used for emitting light of any desired color, however the brightness of such an device is a function of the color; for example with red, green and blue LEDs only the red LED is used for producing a red color. By contrast, white light has a clearly higher brightness, as all three LEDs then emit light.

Alternatively, white light can also be produced by what are referred to as phosphor-converted LEDs (pcLEDs). Here, an individual LED emits, for example, blue primary radiation, which is partly absorbed by a phosphor layer and re-emitted as secondary radiation having a longer wavelength, for example in the yellow, red or green spectral region (light-conversion). The white light is produced by means of additive color mixing of primary and secondary radiation. Here, the color point of the white mixed light is determined by the composition of the phosphor layer and the relative contributions of primary and secondary radiation. The arrangement can be configured in a simple manner by using a single light source. A sensor arrangement for the adapted control of a plurality of light sources for producing colored light is dispensed with. In the case of an aging-related shift of the wavelength of the primary radiation of the LED, the contribution of the secondary radiation changes due to the wavelength dependence of the conversion mechanism of the phosphor layer and thus the color point of the light changes too. In this system, readjusting the color point is not possible. Likewise, in phosphor-converted arrangements with the same brightness, the color of the light cannot be variably adjusted, as the primary wavelength and composition of the phosphor material as well as its geometry are fixed.

Laser diodes as light sources emit substantially monochromatic radiation, which shows only minor shifts of the maximum intensity over the operation period, so that a possible change of the color point due to an aging-related shift of the wavelength of the primary radiation can be ignored. Document US 20040263074 discloses a light-emitting device having a laser diode as the light source and a light-converting phosphor layer for emitting white light, which is arranged directly on the laser diode. In this connection, the composition of the light-converting phosphor layer as well as the portions of the primary and secondary radiation determine the color point of the white light. However, here also a subsequent variable setting of only the color of the light is not possible. Additionally, the operating temperature of the laser diode (just as with pcLEDs) may lead to heating up of the phosphor layer, which in turn may lead to thermal degradation of the conversion characteristics of the phosphor layer over the operation period and thus to a non-compensable color point shift of the white light. Also in this case, readjusting of the color point is not possible.

It is therefore an object of this invention to provide an efficient light-emitting device comprising a solid-state light source, by means of which a color point that is stable over the life span and independent of the power of the primary radiation, can be set in a simple manner.

This object is achieved by a light-emitting device for emitting light having a desired color point, comprising at least one solid-state light source, at least one light-converting element, a light guiding arrangement and a switch control unit, wherein the solid-state light source is provided for emitting primary radiation, the light guiding arrangement arranged between the solid-state light source and the light-converting element is provided with at least one electro-optical switch for controllably splitting the primary radiation into a first portion and a second portion, the switch control unit is provided for controlling the electro-optical switch(es) for variably adjusting the ratio between the first and the second portion of the primary radiation, and the light-converting element is provided for the partial or complete absorption of at least a first portion of the primary radiation and for the re-emission of secondary radiation.

Here, the term electro-optical switches denotes elements which develop a changeable optical effect as a result of an electric drive. The term "splitting" also comprises a deflection of the split primary radiation into a direction of propagation different from the direction of propagation of the primary radiation before it enters an electro-optical switch. Here, explicitly, devices are also included having a plurality of solid-state light sources for each emitting primary radiation, wherein the primary radiation of the individual laser diodes can be the same or different. In this connection, the primary radiation of the solid-state light source can have a maximum intensity in different spectral regions according to the field of application. For producing white light, the maximum intensity of the primary radiation must lie in the blue or the ultra-violet spectral region, as the conversion of the primary radiation leads to secondary radiation having a longer wavelength and white light must have a portion of blue light.

The primary radiation split up into two portions by an electro-optical switch enables, via the subsequent light conversion of at least a part of the primary radiation, the production of light having a desired color point. By arranging the electro-optical light guiding arrangements between the solid-state light source and the light-converting element, the solid-state light source and the light-converting element are spatially separated, which prevents thermal degradation of the conversion characteristics of the light-converting material caused by the operating temperature of the solid-state light source and, in this respect, enables a stable setting of the color point. Besides, an electro-optical light guiding arrangement does not comprise any mechanically moving parts.

In accordance with the invention, the electro-optical switch not only takes over the function of a beam splitter that divides the primary radiation into a first and a second portion at a fixed ratio, but is a variable element for the temporal control of this ratio (modulator operation). By a variable ratio between both portions of the primary radiation split up after passing through the electro-optical switch, the color point can be varied as per the wishes of a user. For example, the first portion is used for producing yellow light and the second portion for producing blue light, which results in white light when mixed suitably. If the switch control changes, for example, the ratio in favor of the second portion, then the blue portion in the mixed light increases; in the opposite case, for example, the yellow portion would increase. This applies equally to emitted light in other first and second spectral regions. As electro-optical light guiding arrangements can be switched fast, such a variation can take place very fast. Depending upon the embodiment of the electro-optical switch and the control voltage, this may well lie in the range of fractions of ns. The mixing of the light radiated by the light-converting element takes place in an area that, viewed in the light radiation direction, is situated above the light-converting element, the size of said area depending on the radiation characteristic of the light-converting element and its dimensions. As light-converting elements are composed of more or less light scattering materials, for example phosphor powder layers or phosphor ceramics, a mixed light having an at least substantially homogeneous color impression is obtained above a suitable distance.

Besides other areas of application, the light-emitting device in accordance with the invention can be used for example in the areas of home lighting, business lighting, as what is referred to as a backlight system for displays, as ambient lighting, or in the automobile sector.

In a further embodiment, the solid-state light source is a laser diode. Laser diodes have a high power density and the maximum intensity of the primary radiation of a laser diode is very stable over the operation period. Due to the almost monochromatic spectrum, the light of a laser diode is particularly well suited to enable, apart from a defined excitation of the secondary radiation, a precise deflection by a light guiding arrangement, which also contributes to a high efficiency of the light-emitting device. In this connection, it is favorable if the laser diode is connected to the electro-optical switch by means of a waveguide for the efficient incoupling of primary radiation into the electro-optical switch. The optical incoupling faces for the effective splitting of the primary radiation into at least two portions are very small, typically in a range below 10 mm$^2$, so that light incoupling by means of appropriate waveguides leads to a decrease in light losses.

In a further embodiment, the light-converting element comprises at least a first area for incoupling the first portion of the primary radiation for producing light in the first spectral region, and a second area for incoupling the second portion of the primary radiation for producing light in the second spectral region. Which spectral regions of the visible light are denoted as the first and the second spectral regions depend on the embodiment of the light-converting element and the primary radiation used. White light can be obtained by mixing, for example, blue and yellow light or blue, green and red light, which was produced by at least partial conversion of primary radiation. Here, the blue light can be produced, for example, by conversion of shorter-wave primary radiation in the light-converting element, or blue primary radiation passes, at least partially converted, the light-converting element.

In a further embodiment, the light guiding arrangement comprises a first electro-optical switch for a controllable first splitting of the primary radiation and one or two second electro-optical switches for a controllable second splitting of the primary radiation, which has passed the first electro-optical switch. By further splitting the primary radiation into more than two portions, the light can be incoupled into the light-converting element in a locally very different manner, which enables, for example, modulation of the brightness of the converted light. This effect can be increased, if the light guiding arrangement comprises further electro-optical switches at least for a third controllable deflection of the primary radiation, which has passed one of the second switches. Thus, the primary radiation can be split into a plurality of (n>2) branches by a cascade of electro-optical switches.

In a preferred arrangement, the portions of the primary radiation are guided between two electro-optical switches by means of a waveguide for further splitting and incoupled into the second or the further electro-optical switches. Thus, light losses can be avoided in the case of a cascade of several electro-optical switches.

In a preferred embodiment, the light-converting element comprises one or a plurality of further areas for incoupling further portions of the primary radiation, which were produced by at least a second electro-optical switch. The multiply split primary radiation enables a larger number of different spectral regions to be produced by suitable conversion of the primary radiation in the light-converting element. With, for example, three areas of materials, which emit blue, green and red light, or better still four ranges, which emit blue, green, orange and red light, mixed light having a high color rendering index can be obtained. The materials suitable for producing different visible spectral regions are known to those skilled in the art.

In this connection, the switch control unit can operate the electro-optical switch in an analog mode for the simultaneous deflection of the primary radiation in the first and second direction of propagation or in a digital mode for the deflection of the primary radiation alternately in the first or the second direction of propagation. In embodiments having a plurality of electro-optical switches, the control unit can also operate a plurality of electro-optical switches in the analog mode and/or in the digital mode.

In a further embodiment, the device for emitting mixed light furthermore comprises a control unit for the solid-state light source for producing pulsed primary radiation having an adjustable pulse duration. In this way, if the color point has been fixed by the operation of the electro-optical switches, the brightness can be increased or decreased by means of an enlarged or shortened pulse duration.

In a further embodiment, the device for emitting mixed light furthermore comprises a light-mixing optical system arranged behind the light-converting element, viewed in the direction of propagation of light, for mixing the light. In this connection, a light-mixing optical system may be, for example, a diffuser plate, an arrangement of micro lenses or other arrangements for the scattering or deflection of the light. Via such light-mixing optical systems a uniform color impression of the emitted light is already obtained at a small distance to the light-converting element. Without such a light mixing device, the distance at which a uniform color impression is obtained depends, on the one hand, on the angular distribution of the emitted light and, on the other hand, on the lateral dimension of the light-converting element. The lateral dimension is to be understood here as the dimension perpendicular to the mean direction of propagation of the light. Thus, with a light mixing optical system, a light-emitting device can accommodate more elements as they are closer spaced.

Furthermore, the invention relates to a method of operating a light-emitting device, which comprises the following steps:

Emission of primary radiation by a solid-state light source,

Splitting of the primary radiation by means of at least one electro-optical switch into at least a first portion and a second portion of the primary radiation, Partial or complete absorption of at least the first portion of the primary radiation and re-emission of secondary radiation by the light-converting element, Variable setting of a ratio between the first and the second portion of the primary radiation by means of a switch control unit for controlling the electro-optical switches for emitting light having a desired color point These and other aspects of the invention are apparent from and will be elucidated with reference to the embodiments described hereinafter, though the invention should not be considered as limited to these.

Figure 2:
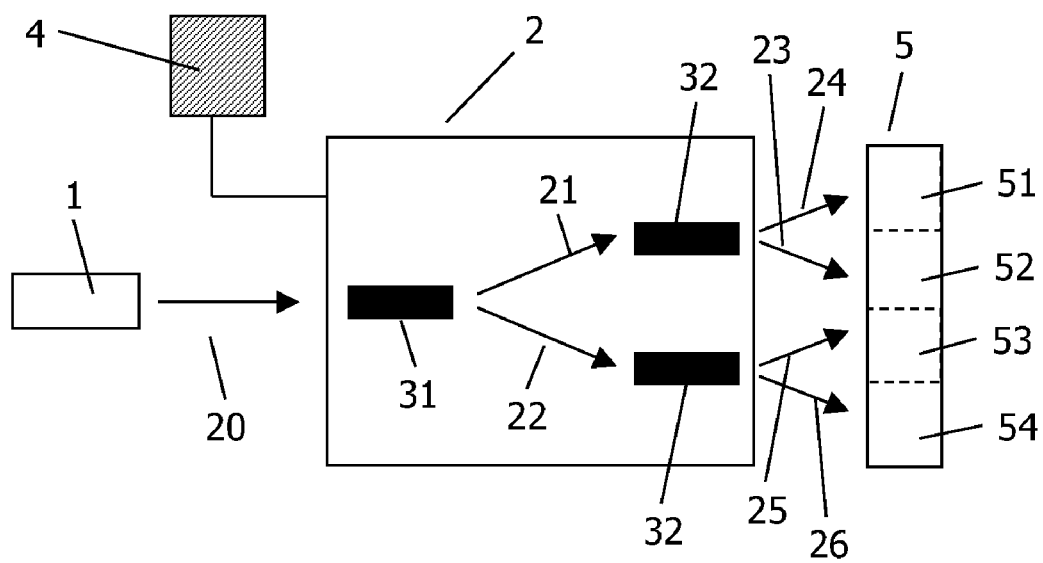
Figure 3:
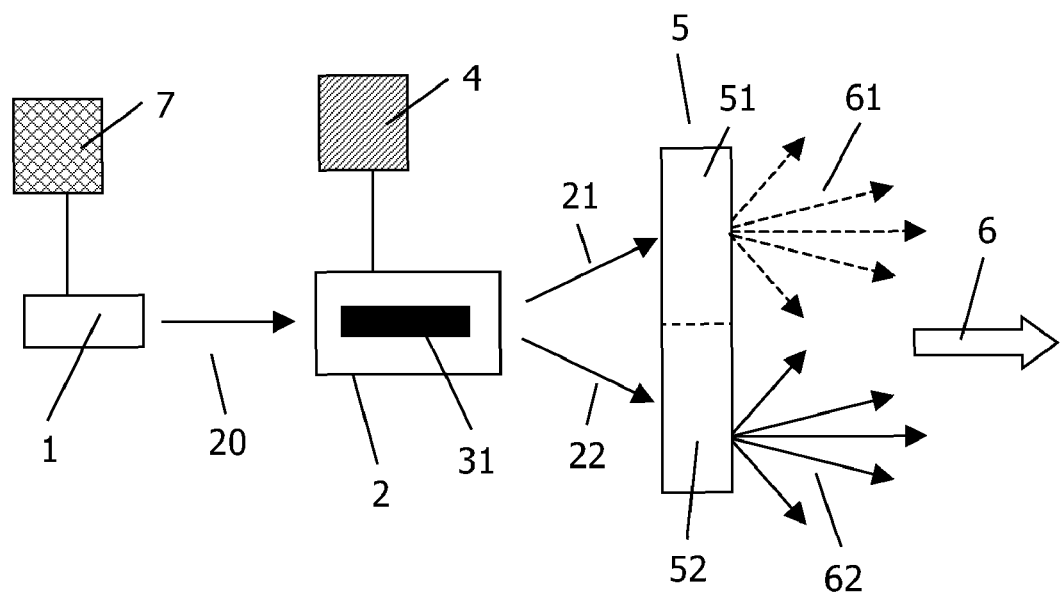
Figure 4:
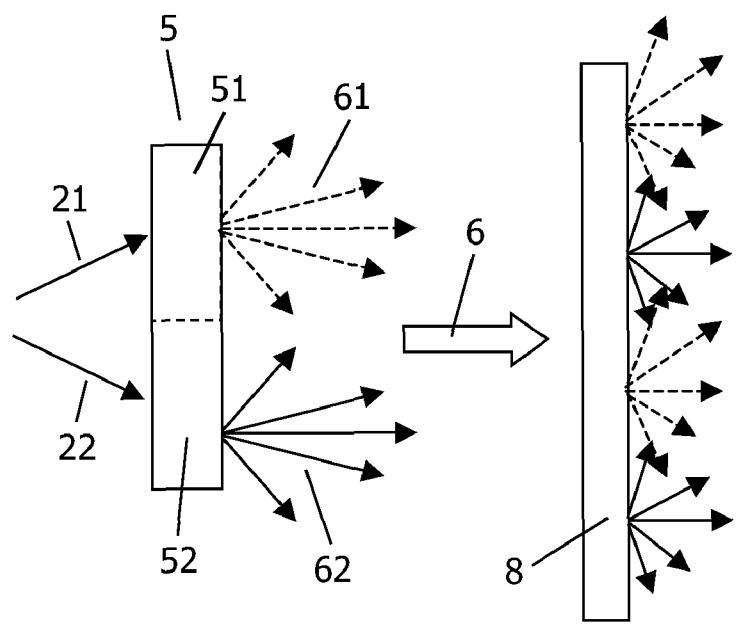

In the drawings:

FIG. 1 shows a schematic representation of a light-emitting device in accordance with the invention, FIG. 2 shows a schematic representation of a light-emitting device, in accordance with the invention, having a plurality of electro-optical switches, FIG. 3 shows a schematic representation of a light-emitting device, in accordance with the invention, having a control unit for the solid-state light source, FIG. 4 shows a schematic representation of a light-emitting device, in accordance with the invention, having a light mixing optical system.

FIG. 1 shows a light-emitting device for emitting light having a desired color point, which comprises a solid-state light source 1, a light-converting element 5 of one or more different light-converting materials (what are referred to as phosphor materials), a light guiding arrangement 2 and a switch control unit 4. The materials suitable for a desired light conversion vary depending upon the field of application and the primary radiation 20 used. The materials suitable for the specific primary radiations are known to those skilled in the art.

The solid-state light source 1 emits primary radiation 20, which can have its maximum intensity in different spectral regions depending upon the embodiment of the light-emitting device. The solid-state light source 1 can be operated in an analog or pulsed mode. For devices which are to emit white light, the maximum intensity of the primary radiation is in the blue or still shorter-wave spectral region, so that light of all ranges of the visible spectrum can be produced by means of light conversion via a suitable phosphor material. Conventional organic LEDs (OLEDs), non-organic LEDs or laser diodes can be used, for example, as solid-state light sources. The solid-state light sources 1 can be spatially separated from the electro-optical switch 31 or can be arranged on the electro-optical switch 31 so as to be in direct contact therewith.

If the solid-state light source 1 is spatially separated from the electro-optical switch 31 (as represented in FIG. 1), the light emitted by the solid-state light source should be incoupled into the electro-optical switch by means of a suitable optical system arranged between the solid-state light source 1 and the electro-optical switch 31 in order to avoid light losses. This suitable optical system may comprise, for example, a lens system or an arrangement of waveguides. Particularly with laser diodes, a waveguide is favorable, due to the directed narrow-band light emission, for the incoupling of light into the electro-optical switch. For example, a laser diode having an emission wavelength of 450 nm±10 nm can be used. Due to the almost monochromatic spectrum, the light of a laser diode is particularly well suited for an accurate splitting by a light guiding arrangement. In addition, by virtue of the stability of this narrow-band emission no changes arise in the absorption behavior of the phosphor materials due to a shifting spectrum of the primary radiation over the operation period of the light-emitting arrangement. Thus, the color point of the emitted light can be held very constant without an adjustment by the switch control unit.

The light guiding arrangement 2, which comprises one or a plurality of electro-optical switches 31, is arranged between the solid-state light source 1 and the light-converting element 5 in order to, on the one hand, spatially separate the solid-state light source 1 from the light-converting element 2, whereby thermal degradation of the light-converting material due to the operating temperature of the solid-state light source 1 is clearly reduced or avoided. On the other hand, controllable splitting of the primary radiation 20 into a first portion 21 and a second portion 22 is enabled by at least one electro-optical switch 31. In this connection, the term "splitting" includes a deflection, so that the first, second and further portions, if any, of the primary radiation can propagate in another direction of propagation than the primary radiation before the splitting by the first electro-optical switch. Thus, different areas 51 and 52 of the light-converting element 5 can be irradiated by one and the same solid-state light source 1 with primary radiation of the same wavelength. The portions 21 and 22 of the primary radiation 20, which impinge on the different areas 51 and 52, can be variably adjusted via the switch control unit 4. The operating parameters, applied to the electro-optical switches by the switch control unit 4, determine the ratio between the first portion 21 and the second portion 22 of the primary radiation 20. The portions 21 and 22 of the primary radiation are incoupled into the light-converting element 5 at different areas 51 and 52 and are at least partly converted into a secondary radiation that depends on the composition of the respective area. At a given primary radiation 21 and 22, the areas 51 and 52 emit light 61 and 62, respectively, whose spectral regions are determined by the composition and the absorption capacity of the light-converting material in the respective area 51 or 52. The light 61 and 62 of the appropriate spectral regions 61 and 62 mixes due to the more or less strong light scattering characteristics of the light-converting materials. In a special embodiment, where, for example, the second portion 22 of the primary radiation should pass the area 52 of the light-converting element in an unconverted manner (for example, the area 52 does not comprise phosphor material), scattering, non-absorbing particles could provide for light scattering of the light-converting element. In this case, the second spectral region 62 would be equal to the spectral region of the primary radiation (for example, blue light). In the case of ultraviolet primary radiation, for example, the second area 52 would not let the primary light pass unconverted, but would convert it by means of suitable materials into visible light, for example blue light. The color point of the mixed light comprising light of the spectral regions 61 and 62 can be varied by a changed ratio between the first portion 21 and second portion 22 of the primary radiation 20. If, for example, the area 51 emits in the yellow spectral region and the area 52 in the blue spectral region, then a white mixed light results for the distant viewer. If the first portion of the primary radiation is relatively increased, then the yellow portion of the white light is increased. Conversely, the blue portion can be intensified. Depending upon the field of application, another mixed light having another color point can also be produced using other light-converting materials.

A variation of the portions relative to each other can be obtained, for example, by applying a different voltage to an electro-optical switch 31. As a result, the ratio shifts cosinoidally with the applied voltage. At an operating voltage V and a maximum voltage $V_{max}$ to be applied to the electro-optical switch 31, the following ratio is obtained between the first portion 21 (A1) and second portion 22 (A2):

$$\frac{A1}{A2} = \frac{\cos(\pi * V / V_{max})}{(1 - \cos(\pi * V / V_{max}))}$$

If an operating voltage of, for example, 50% of the maximum voltage is applied to such a switch, equally large first and second portions A1 and A2 of the primary radiation are obtained, which propagate further in a first and a second direction of propagation after passing the switch.

Electro-optical switches are known as modulators, for example a Mach-Zehnder-interferometer-modulator, from the optical signal transmission field. Such modulators are small, robust, work fast and do not have inertia. Electro-optical switches use electro-optical effects in order to modulate light. The material used includes, for example, ferroelectric crystals like lithium niobate. The switching times of such electro-optical switches are typically in the nanosecond range. Contrary to a Mach Zehnder interferometer modulator, the light in the light-emitting arrangement, in accordance with the invention, is not modulated, but split into two separate portions. The light entering into the switch is split by means of an optical path splitting later into two essentially parallel waveguides. The optical characteristics of the waveguide material and of the material surrounding the waveguide (like, for example, the refractive index) are selected in such a way that the light waves guided in each of the two waveguides have a transverse propagation range extending into the other waveguide. By means of an externally applied electrical field, the light wave can thus be shifted from one waveguide into the parallel other waveguide. After the light waves have passed the area of the electrical field, the waveguides can be constructed in such a way that the transverse propagation of the light waves no longer reaches into the other waveguide (for example, by an increased distance of the waveguides to each other or a larger refractive index difference between the waveguide material and the surrounding material). At the output of the electro-optical switch in the light-emitting device, in accordance with the invention, the split light emerging from the two waveguides now exits the switch at two spatially separated places. At given optical characteristics, the portions 21 and 22 depend on the operating parameters of the electro-optical switch. In alternative embodiments of the electro-optical switch, a splitting into more than two portions would also be possible by the ramification into more than two parallel waveguides. At an applied voltage, the optical effect on the primary radiation increases with the length of the electro-optical switch. In this respect, the voltage to be applied for obtaining a specific splitting of the primary radiation is a function of the length of the electro-optical switch. For example, electro-optical switches having a length of 5 mm should be operated with a voltage of up to 30V, in order to be able to vary the first or the second portion of the primary radiation from 0% to 100%. Correspondingly, at a length of the electro-optical switch of 3 cm only voltages up to 5V are necessary. The length of the electro-optical switches can vary for different embodiments. Shorter switches are used for very compact light-emitting devices. If the structural depth is subject to smaller limitations, longer switches can also be used. Alternatively, acusto-optical switches can also be used.

Other alternative solutions, for example the use of magneto-optical switches or switches on the basis of liquid crystals, enable an appropriate splitting of the primary radiation as with the above electro-optical or acusto-optical switches, however, these function with differently polarized light and polarizers for adjusting the different portions. Thus, these solutions lead to substantial light losses in the case of a light-emitting device.

The electro-optical switch 31 can be operated, on the one hand, in an analog mode by the switch control unit 4, wherein the color point is produced so as to have appropriate portions 21 to 22 by simultaneous irradiation of the light-converting element 5 by means of a simultaneous deflection of the primary radiation 20 in all the directions of propagation provided by the electro-optical switch or the electro-optical switches 31. In order to very accurately set light having a stable color point, here an initial calibration method is necessary, in which the color point is determined as a function of the control parameters of the switch. In this case, the later effort required for controlling the switch is only small.

On the other hand, the electro-optical switch 31 can also be operated in a digital mode, in which case the primary radiation exits the switch alternately in the direction of propagation 21 or in the direction of propagation 22. Only one area of the light-converting element 5 emits at any point of time as a result of the digital mode. Here, in contrast with the analog mode, an initial calibration of the deflection behavior of the switch does not have to be carried out.

The arrangement shown in FIG. 1 can be extended with a second level of electro-optical switches (second switches), as shown in FIG. 2. Here, firstly the primary radiation 20 is split into two portions 21 and 22 by a first switch 31. The portions can be deflected at a number of angles from the original direction of propagation of the primary radiation 20, as shown in the Figures. This effect of the first electro-optical switch 31 is hereinafter referred to as first splitting. In an embodiment, as represented in FIG. 2, the portions 21 and 22 are each incident on a further electro-optical switch 32, referred to as second electro-optical switch. The two electro-optical switches 32 each divide the portions 21 and 22 into two further portions 23, 24 and 25, 26, respectively, each having different first and second directions of propagation. The effect of the second switches is also denoted as second splitting. With the embodiment shown in FIG. 2, the primary radiation can be divided by a first switch and two further switches into four portions whose ratios to each other can be adjusted by the electro-optical switches, which portions, depending upon the embodiment, are incident on a light-converting element 5, which may comprise one or a plurality of areas having a different composition and/or thickness. If the areas 51 to 54 are identical with regard to composition and absorption behavior, then the variable splitting of the primary radiation 20 into the portions 23 to 26 by means of the switches 31 and 32 can be used for a brightness modulation. If the composition and/or the absorption behavior for the areas 51 to 54 is different, then the areas 51 to 54 can emit, for example, light in a suitable quantity in the spectral regions blue, green, orange and red, which can lead to a white light having a high color rendering index up to almost 100 after sufficient mixing. In another example of embodiment, the areas 51 to 54 could emit a sequence of yellow and blue light, whose color point can be varied locally.

In a preferred device (not shown in the schematic representations), the portions of the primary radiation between two electro-optical switches, for example the portion 21 between the switches 31 and 32 in FIG. 2, are guided by means of a waveguide for further splitting and incoupled into the second or the further electro-optical switches. Thus, light losses can be avoided in the case of a cascade of electro-optical switches. Furthermore, after passing the last switch, the portions of the primary radiation can also be guided to the different areas 51 to 54 of the light-converting element 5 by means of waveguides. For the optical coupling of the waveguides to the solid-state light source, to the electro-optical switch and/or to the light-converting element, or for the optical coupling of the solid-state light source directly to an electro-optical switch, for example adhesion layers of hard or flexible materials having an appropriately adapted refractive index, like for example cross-linkable two-component silicone rubbers or other materials, can be used.

From the examples of embodiment disclosed here, further, not explicitly stated embodiments for obtaining other light effects will be apparent to those skilled in the art. Likewise, the number of electro-optical switches used can be extended depending on the area of application, so that in other embodiments third or further deflections by third or further electro-optical switches arranged in the light guiding arrangement can be also obtained. Embodiments are possible in which, for example, besides a first electro-optical switch 31 only one further second electro-optical switch 32 is available. The same may also be applicable to further switch levels. Likewise, in other embodiments, also a plurality of solid-state light sources can be used for producing a primary radiation or a plurality of different primary radiations.

The example of embodiment represented in FIG. 3 differs from FIG. 1 in that it comprises an additional control unit 7 for the solid-state light source, which is connected with the solid-state light source 1. The control unit 7 for the solid-state light source is provided for operating the solid-state light source 1 in a pulse mode with adjustable pulse duration. The primary radiation 20 pulsed in this example of embodiment is split by the light guiding arrangement 2 as described hereinabove. If the color point of the emitted light 6 is adjusted by the light guiding arrangement 2, the switch control unit 4 and the light-converting element 5, then, in the case of an unchanged color point, the brightness of the light-emitting device can be adjusted via the pulse duration. At a sufficiently high pulse frequency, the viewer perceives only a continuously luminous arrangement. Now, if the pulse duration is increased, then more light quanta are emitted per unit of time and the brightness of the light-emitting device increases independent of the color point of the light. For setting a brightness level, a particularly complex control of the pulse duration is not necessary, which reduces the constructional expenditure of a circuit for controlling the pulse duration.

A more compact embodiment having a homogeneous color impression can be obtained by a light-mixing optical system 8 arranged behind the light-converting element 5, viewed in the light's direction of propagation 6, for mixing the light 61 and 62 emitted by the light-converting element 5, see FIG. 4. Light-mixing optical systems 8 can be designed very differently depending on the area of application. As light mixing optical systems 8, for example, diffuser plates can be used for the diffuse scattering of the light and the resulting thorough mixing of the light, or use can be made of arrangements of mini-lenses to obtain an enhanced light distribution. For alternative embodiments other light-mixing optical system are also applicable.

The embodiments explained by means of the Figures and the description only represent examples of a light-emitting device in accordance with the invention for emitting light having a desired color point, and should not be construed as limiting the patent claims to these examples. Alternative embodiments are also possible for those skilled in the art, which embodiments likewise fall within the scope of protection of the patent claims. The numbering of the dependent claims should not imply that other combinations of the claims do not represent favorable embodiments of the invention. Furthermore, in the description and in the claims the designation "one", "a" or "an" does not exclude a plurality of the arrangements, units or elements.

The invention claimed is:

1. A light-emitting device for emitting light having a desired color point, comprising:
   at least one solid-state light source;
   at least one light-converting element;
   a light guiding arrangement; and
   a switch control unit, wherein
      the solid-state light source is configured to emit primary radiation,
      the light guiding arrangement is arranged between the solid-state light source and the light-converting element and is provided with an electro-optical switch for receiving an operating voltage and in response thereto for controllably splitting the primary radiation into a first portion and a second portion,
      the switch control unit is configured to supply the operating voltage to the electro-optical switch for variably adjusting the ratio between the first portion and the second portion of the primary radiation, and
      the light-converting element includes a first area arranged to receive the first portion of the primary radiation and to at least partially absorb at least the first portion of the primary radiation and to emit secondary radiation therefrom in response to the at least partially absorbed first portion of the primary radiation, and further includes a second area arranged to receive the second portion of the primary radiation.

2. The light-emitting device of claim 1, wherein the solid-state light source is a laser diode.

3. The light-emitting device of claim 2, wherein the laser diode is connected with the electro-optical switch by means of a waveguide for coupling the primary radiation into the electro-optical switch.

4. The light-emitting device of claim 1, wherein the first area outputs the second radiation as light in a first spectral region, and wherein the second area for converts the second portion of the primary radiation into light in a second spectral region different from the first spectral region.

5. The light-emitting device of claim 4, wherein when the light-converting element outputs the light in the first spectral region and the light in the second spectral region are mixed at an output side of the light-converting element.

6. The light-emitting device as claimed in claim 1, wherein the switch control unit operates the electro-optical switch in an analog mode for simultaneously outputting the first portion of the primary radiation in a first direction of propagation and the second portion of the primary radiation in a second direction of propagation different from the first direction of propagation.

7. The light-emitting device of claim 1, further comprising a control unit for the solid-state light source for producing pulsed primary radiation having an adjustable pulse duration.

8. The light-emitting device of claim 1, further comprising a light-mixing optical system arranged behind the light-converting element, viewed in the direction of propagation of light, for mixing the light emitted by the light-converting element.

9. The light-emitting device of claim 1, wherein the switch control unit operates the electro-optical switch in a digital mode for the deflection of the primary radiation to alternatingly output the first portion of the primary radiation in a first direction of propagation and the second portion of the primary radiation in a second direction of propagation different from the first direction of propagation.

10. The light-emitting device of claim 1, wherein when the electro-optical switch receives a particular voltage, the first portion of the primary radiation has a same magnitude as the second portion the primary radiation.

11. The light-emitting device of claim 10, wherein when the particular voltage depends upon a length of the electro-optical switch.

12. The light-emitting device of claim 1, wherein the electro-optical switch comprises ferroelectric crystals.

13. The light-emitting device of claim 12, wherein the ferroelectric crystals comprise lithium niobate.

14. The light-emitting device of claim 1, wherein the switch control unit variably adjusts the ratio between the first and the second portion of the primary radiation, wherein the ratio can be adjusted to have values greater than 0% and less than 100%.

15. A method, comprising:
emitting primary radiation from a solid-state light source,
splitting the primary radiation into at least a first portion and a second portion by means of an electro-optical switch, the first portion propagating in a first direction simultaneously with the second portion propagating in a second direction different from the first direction,
at least partially absorbing at least the first portion of the primary radiation by a light-converting element and emitting secondary radiation from the light-converting element in response to the at least partially absorbed first portion of the primary radiation, and
variably adjusting of a ratio between the first portion and the second portion of the primary radiation by means of a switch control unit for controlling the electro-optical switch for emitting light having a desired color point.

* * * * *